(12) United States Patent
Ham et al.

(10) Patent No.: US 7,547,491 B2
(45) Date of Patent: Jun. 16, 2009

(54) CATHODE ACTIVE MATERIAL, METHOD OF PREPARING THE SAME, AND CATHODE AND LITHIUM BATTERY APPLYING THE MATERIAL

(75) Inventors: Yong-nam Ham, Ansan-si (KR); Gue-sung Kim, Yongin-si (KR); Young-min Choi, Osan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 362 days.

(21) Appl. No.: 11/359,983

(22) Filed: Feb. 21, 2006

(65) Prior Publication Data
US 2006/0204850 A1 Sep. 14, 2006

(30) Foreign Application Priority Data
Feb. 18, 2005 (KR) .................. 10-2005-0013533

(51) Int. Cl.
*H01M 4/48* (2006.01)
(52) U.S. Cl. .............. 429/231.1; 429/231.2; 429/231.3; 429/231.6; 429/223; 429/224; 429/221; 423/594.3; 423/594.4; 423/594.5; 423/594.6; 423/599; 423/594.15; 252/182.1
(58) Field of Classification Search .............. 429/231.1, 429/231.2, 231.3, 231.6, 223, 224, 341, 203, 429/221; 252/182.1; 423/594.3, 594.4, 594.5, 423/594.6, 599, 594.15
See application file for complete search history.

(56) References Cited

FOREIGN PATENT DOCUMENTS

| CN | 1506312 | * | 6/2004 |
|---|---|---|---|
| JP | 1997-180725 | | 7/1997 |
| JP | 1997-289023 | | 11/1997 |
| JP | 11-86846 | * | 12/1997 |
| JP | 1998-208729 | | 8/1998 |
| JP | 1998-302800 | | 11/1998 |
| JP | 1999-086846 | | 3/1999 |
| JP | 2001-273895 | * | 10/2001 |
| JP | 2002-8664 | * | 1/2002 |

* cited by examiner

*Primary Examiner*—Laura S Weiner
(74) *Attorney, Agent, or Firm*—Christie, Parker & Hale, LLP (57) ABSTRACT

Composite cathode active materials comprising a composite oxide and an acid treated with an organic solvent are provided. The composite cathode active materials are prepared by treating mixtures of nickel-based composite oxides and organic acids with organic solvents. The active materials suppress gelation of the electrode slurries for a long period of time, even when the active materials are mixed with fluorine-based polymers, by decreasing the basicity of the slurries and the amount of lithium present on the surfaces of the active materials. As a result, electrode slurries having high stability can be prepared. Cathodes and lithium batteries comprising the slurries have excellent charge-discharge characteristics, including high capacity and excellent high rate discharge characteristics.

13 Claims, 8 Drawing Sheets

CATHODE ACTIVE MATERIAL, METHOD OF PREPARING THE SAME, AND CATHODE AND LITHIUM BATTERY APPLYING THE MATERIAL

CROSS-REFERENCE TO RELATED PATENT APPLICATION

This application claims priority to and the benefit of Korean Patent Application No. 10-2005-0013533, filed on Feb. 18, 2005 in the Korean Intellectual Property Office, the entire content of which is incorporated herein by reference.

FIELD OF THE INVENTION

The present invention relates to composite cathode active materials, methods of preparing the same, and cathodes and lithium batteries including the materials. More particularly, the present invention relates to composite cathode active materials that suppress gelation which occurs during preparation of cathode slurries, and which provides excellent high rate discharge characteristics.

BACKGROUND OF THE INVENTION

Lithium secondary batteries have high voltage and high capacity relative to conventional nickel cadmium secondary batteries. In particular, when lithium transition metal composite oxides such as $LiCoO_2$ and $LiMn_2O_4$ are used as cathode active materials, and carbonaceous materials such as graphite and carbon fiber are used as anode active materials, high voltage of greater than 4V and high capacity can be achieved, and side effects such as short circuits do not occur. Thus, lithium secondary batteries are widely used as power sources for mobile electronic devices such as cellular phones, notebook computers, digital cameras, etc.

Lithium secondary batteries are generally prepared by applying a slurry consisting of an active material and a binder on a metal film, drying the slurry and pressing the film. Although various resins have been used as the binder, fluorine-based resins such as polyvinylidene fluoride, which adheres well to the metal current collector and active material, is commonly used.

Nickel-based active materials have also been proposed as possible cathode active materials instead of the lithium cobalt-based active materials. Nickel-based active materials, generally represented by the formula $LiNi_{1-x-y}Co_xMn_yO_2$ ($0 \leq x+y \leq 0.5$, $x>0$, and $y>0$), have layered structures and high energy capacity of greater than 180 mAh/g. $LiCoO_2$ has a capacity of about 145 mAh/g.

However, when mixing the active material with the fluorine-based binder to prepare the slurry, gelation can occur, resulting in increased viscosity and making it difficult to prepare a stable electrode. Increased slurry viscosity occurs due to the strong basicity of the slurry. The slurry is strongly basic because excess bases are used in preparing the nickel-based active material, which bases remain in the product. The basicity of the slurry causes hydrofluoric acid (HF) to separate from the fluorine-based resin due to double bonds which form between the bases and the fluorine resin. Activated oxygen or water molecules then bind to the double bonds, causing radical reactions. Finally, the crosslinking bonds produced by the radical reactions increase the molecular weight of the fluorine resin. The polyvinylidene fluoride should enhance adhesiveness to the substrate by increasing crystallinity, but the structure of the resin is weak to basicity. Thus, when the slurry is strongly basic and a lot of water remains in the slurry, the reaction rapidly progresses. Accordingly, there is a need to suppress the reaction.

Efforts to suppress gelation have included adding acids, etc. to the fluorine-based binder resin to neutralize the alkali contained in the cathode active material, thereby interrupting the effect of the alkali. Alternative efforts have including neutralizing the N-methyl-pyrrolidone solvent and the fluorine-based binder.

However, since the effect of suppressing gelation by the above methods is not significant, there is still a need for an improved method that can be applied in the practical process for preparing a battery by suppressing gelation substantially.

SUMMARY OF THE INVENTION

In one embodiment of the present invention, a composite cathode active material suppresses the gelation which occurs during cathode slurry preparation.

In another embodiment of the present invention, an electrode slurry comprises the composite cathode active material.

In yet another embodiment of the present invention, a cathode is prepared with the electrode slurry.

In still another embodiment of the present invention, a lithium battery includes the cathode.

In still yet another embodiment of the present invention, a method is provided for preparing the composite cathode active material.

According to one embodiment of the present invention, a composite cathode active material comprises a dry mixture of at least one composite oxide selected from the group consisting of compounds represented by Formulae I and II below and an acid. The dry mixture is prepared by mixing the composite oxide and the acid with an organic solvent, and drying the mixture:

I

II

In Formulae I and II, $0.90 \leq x \leq 1.1$, $0 \leq y \leq 0.9$, $0 \leq z \leq 0.5$, $0 \leq \alpha \leq 2$, M is selected from the group consisting of Al, Ni, Mn, Cr, Fe, Mg, Sr, V, rare earth elements and mixtures thereof, and X is selected from the group consisting of O, F, S and P.

In the composite cathode active material, the organic solvent may be an alcohol, an aldehyde, a ketone, an ether, or the like. Nonlimiting examples of suitable organic solvents include methanol, ethanol, propanol, methyl aldehyde, ethyl aldehyde, dimethyl ketone, diethyl ketone, methylethyl ketone, dimethyl ether, diethyl ether, and the like. The organic solvent may be present in the composite cathode active material in an amount ranging from about 50 to about 200 parts by weight based on 100 parts by weight of the cathode active material.

Nonlimiting examples of suitable acids for use in the composite cathode active material include hydrochloric acid, sulfuric acid, nitric acid, formic acid, acetic acid, carbonic acid, propionic acid, benzoic acid, phenol, boronic acid, oxalic acid, mixed acids, tartaric acid, phthalic acid, hydrogen sulfide, phosphoric acid, citric acid, succinic acid, maleic acid, malonic acid, and the like. The acid may be present in the composite cathode active material in an amount ranging from about 1 to about 30 parts by weight based on 100 parts by weight of the cathode active material.

According to another embodiment of the present invention, a cathode slurry comprises the cathode active material described above, a conductive material, a binder and a diluent.

According to still another embodiment of the present invention, a cathode is prepared with the cathode slurry.

According to yet another embodiment of the present invention, a lithium battery includes the cathode.

According to still yet another embodiment of the present invention, a method of preparing the composite cathode active material comprises mixing at least one cathode active material selected from the group consisting of compounds represented by Formulae I and II with an acid and an organic solvent, and drying the mixture at a temperature ranging from about 200 to about 700° C. for about 2 to about 24 hours.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

The present invention will now be described with reference to the accompanying drawings, in which exemplary embodiments of the invention are shown. It is understood, however, that the described embodiments are provided for illustrative purposes only, and the present invention is not limited to the described embodiments. Throughout the specification, like numbers refer to like elements.

A composite cathode active material according to one embodiment of the present invention is prepared by mixing a nickel-based cathode active material with an organic acid and treating the mixture with an organic solvent. Unlike conventional nickel-based cathode active materials, the composite cathode active materials of the present invention suppress gelation of the active material slurry for a long period of time during slurry preparation by adding a fluorine-based polymer. The addition of the fluorine-based polymer decreases the alkalinity and the amount of lithium present on the surface of the active material. Accordingly, the composite cathode active materials of the present invention can be used to prepare batteries having improved high rate discharge characteristics.

In one embodiment of the present invention, a composite cathode active material comprises a dry mixture of at least one composite cathode active material selected from the group consisting of compounds represented by Formulae I and II below, and an acid. The dry mixture is prepared by mixing the composite oxide and the acid with an organic solvent, and then drying the mixture.

In Formulae I and II, $0.90 \leq x \leq 1.1$, $0 \leq y \leq 0.9$, $0 \leq z \leq 0.5$, $0 \leq \alpha \leq 2$, M is selected from the group consisting of Al, Ni, Mn, Cr, Fe, Mg, Sr, V, rare earth elements and mixtures thereof, and X is selected from the group consisting of O, F, S and P.

As described above, when the cathode active material and the organic acid are treated with the organic solvent, the cathode active material reacts with the acid in the organic solvent, thereby neutralizing the basic components ($Li_2O$, LiOH, etc.) remaining in the cathode active material. The basic components are neutralized when the lithium ions bond to the anions of the acid to form complex compounds. Accordingly, when the solvent is dried, the water generated from the acid-base reaction forms an azeotrope with the organic solvent which are then evaporated and removed together. Therefore, only a complex compound of the cathode active material and lithium as a core metal remains in the dry mixture.

As noted above, in conventional slurries, the basicity of the slurry causes hydrofluoric acid (HF) to separate from the fluorine-based resin due to double bonds which form between the bases and the fluorine resin. Activated oxygen or water molecules then bind to the double bonds, causing radical reactions, and the crosslinking bonds produced by the radical reactions increase the molecular weight of the fluorine resin. However, because the basic material of slurry is removed and because the composite cathode active materials of the present invention contain little water, the condensation reaction separating the hydrofluoric acid from the fluorine-based resin (which is promoted by the presence of bases) is dramatically slowed, as are the radical reactions creating the crosslinking bonds (promoted by the presence of water). These reactions are significantly slowed even when the active material is mixed with a fluorine-based resin.

According to one embodiment of the present invention, the organic solvent is capable of being partially mixed with water. Such solvents can include alcohols, aldehydes, ethers, and the like. Organic solvents capable of being mixed with water are used because when so mixed, an azeotrope mixture is formed and the solvent and azeotrope are evaporated together at a specific temperature. Nonlimiting examples of suitable organic solvents include methanol, ethanol, propanol, methyl aldehyde, ethyl aldehyde, dimethyl ketone, diethyl ketone, methylethyl ketone, dimethyl ether, diethyl ether, and the like.

According to the present invention, the amount of the organic solvent may be 50 to 200 parts by weight based on 100 parts by weight of a cathode active material. If the amount of the organic solvent exceeds 200 parts by weight, it takes a long time to remove the organic solvent. If the amount is less than 50 parts by weight, mixing may not be uniform.

Nonlimiting examples of suitable acids include hydrochloric acid, sulfuric acid, nitric acid, formic acid, acetic acid, carbonic acid, propionic acid, benzoic acid, phenol, boronic acid, oxalic acid, mixed acids, tartaric acid, phthalic acid, hydrogen sulfide, phosphoric acid, citric acid, succinic acid, maleic acid, malonic acid, and the like. The acid may also be an organic acid that can form an organic multivalent anion capable of forming a complex compound with a lithium cation. Such acids include succinic acid, maleic acid, malonic acid, and the like.

The organic acid may be present in the composite cathode active material in an amount ranging from about 1 to about 30 parts by weight based on 100 parts by weight of the cathode active material. If the organic acid is present in an amount exceeding about 30 parts by weight, some organic acid remains after drying. If the organic acid is present in an amount less than about 1 part by weight, the alkali us not effectively removed.

In another embodiment of the present invention, a cathode slurry comprises the cathode active material described above, a conductive material, a binder and a diluent. This cathode slurry undergoes a separate acid-base reaction between only the cathode active material, the organic acid and the diluent. In contrast, conventional cathode slurries undergo reactions between the conventional cathode active material, the fluorine resin, the organic acid and the diluent. According to this embodiment of the present invention, prevention of the crosslinking reaction of the fluorine resin is achieved when the cathode slurry is mixed with the fluorine-based binder resin. Accordingly, the increased viscosity is insignificant even when the cathode slurry is mixed with the fluorine resin.

The conductive material is added to the slurry to enhance the current collectivity of the cathode active materials. The conductive material should have high conductivity, and carbon is one suitable example. Nonlimiting examples of suitable conductive materials include activated carbon, various cokes, natural and artificial graphite, and the like. In one embodiment, graphite having excellent conductivity is used. The conductive material may take any suitable shape, for example the material may be spherical or plain.

The binder is a polymer for enhancing adhesiveness between the cathode active material and the current collector, and may be a fluorine resin. Nonlimiting examples of suitable binders include polyvinylidene fluoride (PVdF), polyvinyl fluoride and copolymers thereof. In one embodiment, polyvinylidene fluoride is used because it adheres well to the current collector.

The diluent should be suitable as a solvent for the fluorine resin. Nonlimiting examples of suitable diluents include acetone, methyl ethyl ketone, acetyl acetone, cyclohexanone, methyl acetate, methyl acrylate, diethyl carbonate, γ-butyrolactone, dimethyl formamide, dimethyl acetamide, N-methyl-2-pyrrolidone, hexamethylphosphoramide, diethylene triamine, ethylene oxide, propylene oxide, tetrahydrofuran, dioxane, and the like.

According to another embodiment of the present invention, a cathode comprises the composite cathode active material described above. The electrode may be prepared by forming the cathode slurry comprising the composite cathode active material and the binder into a specific shape, and applying the cathode slurry on a current collector such as aluminum foil.

More particularly, after preparing the cathode slurry, it is directly coated on the aluminum foil current collector. Alternatively, the slurry is cast on a separate support to form a film, which film is then removed from the support and laminated on the aluminum foil current collector. The cathode may also be manufactured into any other known shapes.

Figure 5:
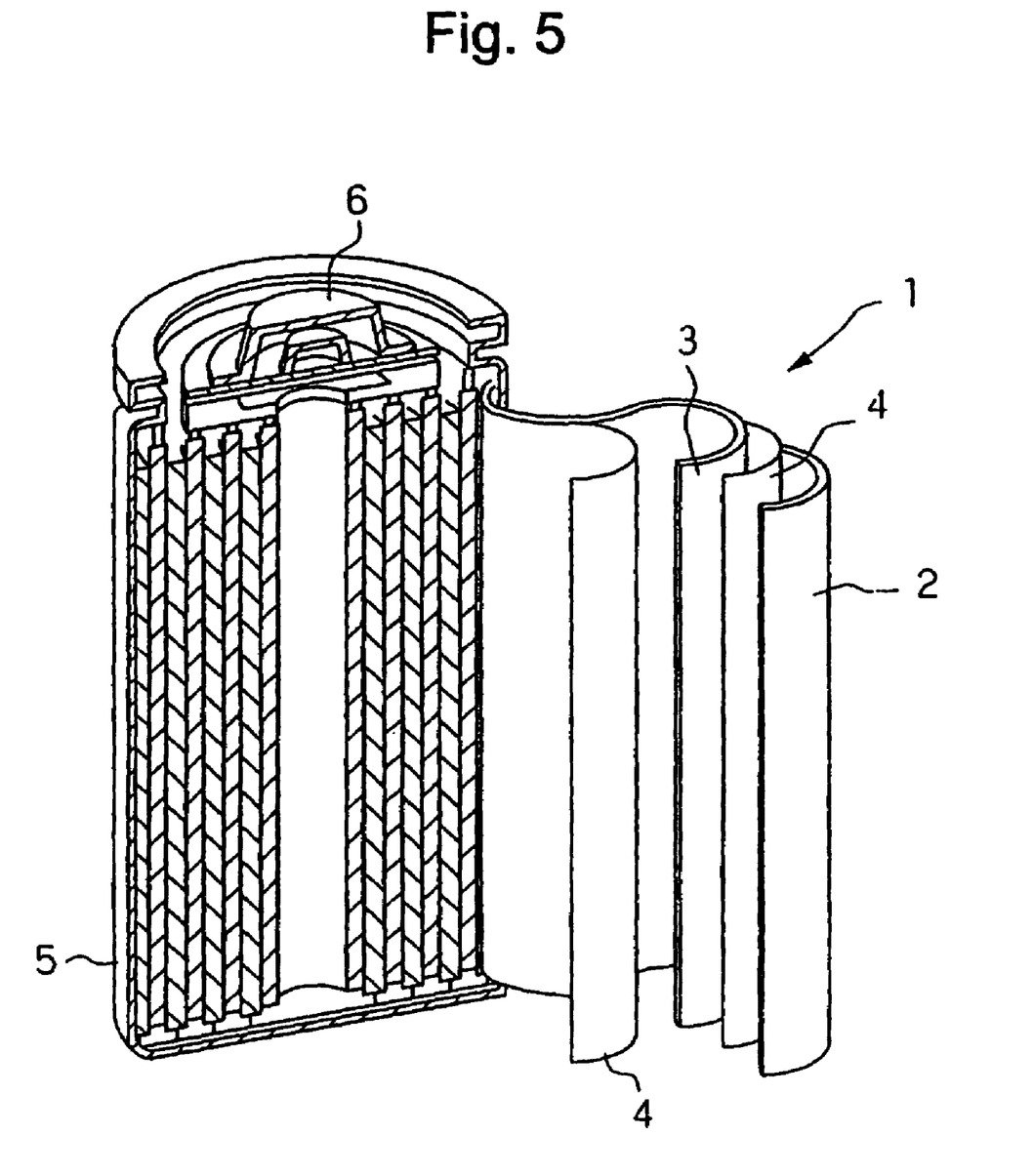
FIG. 5 is schematic of a lithium battery according to one embodiment of the present invention.

In another embodiment of the present invention, a lithium battery comprises the cathode described above. As shown in FIG. 5, the lithium battery 1 comprises an anode 2, a cathode 3 and a separator 4 positioned between the anode 2 and cathode 3. The anode 2, cathode 3 and separator 4 are wound together to form an electrode assembly. The electrode assembly is enclosed within a battery case 5, which is then sealed with a cap assembly 6.

The lithium battery is prepared by first preparing an anode active material composition by mixing an anode active material, a conductive material and a solvent. An anode plate is prepared by directly coating the anode active material composition on a copper foil current collector and drying the composition. Alteratively, the anode active material composition is cast on a separate support to form a film, and the anode plate is prepared by removing the film from the support and laminating the film on the copper foil current collector.

The anode active material may comprise a lithium metal, a lithium alloy, a carbon material, an group XIV or XV metal oxide, a carbon compound, a silicon carbide compound, a silicon oxide compound, a titanium sulfide compound, a boron carbide compound, or the like. The carbon material can include a material formed by subjecting an organic material to pyrolysis under varying pyrolysis conditions. Alternatively, the carbon material may include artificial graphite, natural graphite, soil graphite, swollen graphite, scaly graphite, or the like.

One nonlimiting example of a suitable conductive material is carbon black.

Nonlimiting examples of suitable binders include vinylidenefluoride/hexafluoropropylene copolymers, polyvinylidene fluoride, polyacrylonitrile, polymethyl methacrylate, polytetrafluoroethylene, carboxymethyl cellulose and mixtures thereof. Styrene butadiene rubber-based polymers may also be used as the binder.

Nonlimiting examples of suitable solvents include N-methyl pyrrolidone, acetone, water, and the like.

The anode active material, the conductive material, the binder and the solvent are used in amounts commonly used in lithium batteries.

The lithium battery also includes a separator and any separator commonly used in lithium batteries may be used. The separator should have low resistance to ion transfer of the electrolyte and electrolyte impregnation properties. Nonlimiting examples of suitable materials for use as the separator include glass fiber, polyester, Teflon, polyethylene, polypropylene, polytetrafluoroethylene (PTFE) and combinations thereof. The separator may comprise woven or non-woven fabrics. In lithium ion batteries, separators that can be wound and that are made of materials such as polyethylene, polypropylene, and the like may be used. In lithium ion polymer batteries, separators having good impregnation properties for organic electrolytes may be used. These separators can be prepared as follows.

A polymer resin, a filler and a solvent are mixed to prepare a separator composition. A separator film is then formed by directly coating the separator composition on an electrode and drying the composition. Alteratively, the separator composition is cast on a separate support and dried to form a separator film, which film is then separated from the support and laminated on an electrode.

The polymer resin is not limited and can comprise any material that can be used as a binder for an electrode plate. Nonlimiting examples of suitable binders include vinylidenefluoride/hexafluoropropylene copolymers, polyvinylidene fluoride, polyacrylonitrile, polymethylmethacrylate and mixtures thereof.

The electrolytic solution is prepared by dissolving at least one electrolyte in a solvent. The electrolyte may include lithium salts, nonlimiting examples of which include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(CyF_{2y+1}SO_2)$ (wherein x and y are natural numbers), LiCl, LiI and mixtures thereof. Nonlimiting examples of suitable solvents include propylene carbonate, ethylene carbonate, diethyl carbonate, methyl ethyl carbonate, methyl propyl carbonate, butylene carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl acetamide, dimethyl sulfoxide, dioxane, 1,2-dimethoxy ethane, sulfolane, dichloroethane, chlorobenzene, nitrobenzene, dimethyl carbonate, methyl isopropyl carbonate, ethyl propyl carbonate, dipropyl carbonate, dibutyl carbonate, diethyleneglycol, dimethyl ether and mixtures thereof.

The separator is positioned between the anode plate and the cathode plate, and the anode plate, cathode plate and separator are wound or folded together to form an electrode assembly. The electrode assembly is then placed in a cylindrical or prismatic battery case, and an organic electrolytic fluid is injected into the battery case to form a lithium ion battery.

Alternatively, the cell structures may be stacked to form a bi-cell structure, which is impregnated with the organic electrolytic fluid. The resulting structure is placed in a pouch and sealed to form a lithium ion polymer battery.

According to another embodiment of the present invention, a method of preparing the composite cathode active material comprises first mixing at least one cathode active material selected from the group consisting of compounds represented by Formulae I and II, and an organic acid with an organic solvent to form a mixed solution. The mixed solution is then dried at a temperature ranging from about 200 to about 700° C. for about 2 to about 24 hours, yielding a dry mixture.

When the drying temperature is less than about 200° C., the organic acid and the organic solvent remain in the mixture. When the drying temperature exceeds about 700° C., the active material is pyrolized. When the drying time is less than about 2 hours, the organic acid and the organic solvent remain in the mixture. When the drying time exceeds 24 hours, production cost becomes excessive.

The present invention will now be described with reference to the following Examples. The Examples are provided for illustrative purposes only and are not intended to limit the scope of the present invention.

Preparation of Composite Cathode Active Materials

EXAMPLE 1

20 g of ethanol was added to 20 g of $LiNi_{0.8}Co_{0.1}Mn_{0.1}O_2$ powder and 0.1 g of citric acid, and the materials were homogeneously mixed by stirring with a mechanical stirrer for 5 minutes. The resulting mixed solution was dried at 600° C. for 12 hours to prepare a dry powder of composite cathode active material.

EXAMPLE 2

A composite cathode active material was prepared as in Example 1, except that 0.2 g of maleic acid was used instead of 0.1 g of citric acid.

EXAMPLE 3

A composite cathode active material was prepared as in Example 1, except that 0.4 g of malonic acid was used instead of 0.1 g of citric acid.

COMPARATIVE EXAMPLE 1

20 g of $LiNi_{0.8}Co_{0.1}Mn_{0.1}O_2$ powder was used as the cathode active material.

COMPARATIVE EXAMPLE 2

A composite cathode active material was prepared as in Example 1, except that 0.4 g of malonic acid was used instead of 0.1 g of citric acid, and 20 g of water was used instead of 20 g of ethanol.

Preparation of the Electrode Slurry

EXAMPLE 4

94 g of the cathode active material prepared according to Example 1, 3 g of conductive material (Super-P: acetylene black from 3M Company) and 3 g of binder (PVdF) were mixed with 70 g of N-methyl-pyrrolidone for 12 hours and then allowed to stand to form an electrode slurry.

EXAMPLE 5

94 g of the cathode active material prepared according to Example 2, 3 g of conductive material (Super-P: acetylene black from 3M Company) and 3 g of binder (PVdF) were mixed with 70 g of N-methyl-pyrrolidone for 12 hours and then allowed to stand to form an electrode slurry.

EXAMPLE 6

94 g of the cathode active material prepared according to Example 3, 3 g of conductive material (Super-P: acetylene black from 3M Company) and 3 g of binder (PVdF) were mixed with 70 g of N-methyl-pyrrolidone for 12 hours and then allowed to stand to form an electrode slurry.

COMPARATIVE EXAMPLE 3

94 g of the cathode active material prepared according to Comparative Example 1, 3 g of conductive material (Super-P: acetylene black from 3M Company) and 3 g of binder (PVdF) were mixed with 70 g of N-methyl-pyrrolidone for 12 hours and then allowed to stand to form an electrode slurry.

COMPARATIVE EXAMPLE 4

94 g of the cathode active material prepared according to Comparative Example 2, 3 g of conductive material (Super-P: acetylene black from 3M Company) and 3 g of binder (PVdF) were mixed with 70 g of N-methyl-pyrrolidone for 12 hours and then allowed to stand to form an electrode slurry.

Preparation of the Cathode and the Lithium Battery

EXAMPLE 7

The cathode slurry prepared as in Example 4 was applied on a Cu current collector to a thickness of 200 μm using a doctor blade and the slurry was then dried. The current collector was again dried at 110° C. under vacuum to prepare a cathode.

The cathode was roll-pressed to form a sheet. A 2000 mAh-grade 18650 cylindrical lithium battery was then prepared using the cathode, a graphite counter electrode, a PTFE separator, and an electrolytic solution comprising 1M $LiPF_6$ dissolved in a 3:7 mixed ethylene carbonate (EC)+diethyl carbonate (DEC) (3:7) solvent.

EXAMPLE 8

The cathode slurry prepared as in Example 5 was applied on a Cu current collector to a thickness of 200 μm using a doctor blade and the slurry was then dried. The current collector was again dried at 110° C. under vacuum to prepare a cathode.

The cathode was roll-pressed to form a sheet. A 2000 mAh-grade 18650 cylindrical lithium battery was then prepared using the cathode, a graphite counter electrode, a PTFE separator, and an electrolytic solution comprising 1M $LiPF_6$ dissolved in a 3:7 mixed ethylene carbonate (EC)+diethyl carbonate (DEC) (3:7) solvent.

EXPERIMENT 1

Atomic Absorption Spectroscopy (AAS) Analysis of Concentration 1 g of each of the composite cathode active material powders prepared according to Examples 1 through 3 and Comparative Examples 1 and 2 was dispersed in 10 ml of N-methyl-pyrrolidone, and the dispersion was analyzed with AAS. The results are summarized in Table 1 below.

EXPERIMENT 2

Measurement of pH 1 g of each of the composite cathode active material powders prepared according to Examples 1 through 3 and Comparative Examples 1 and 2 was dispersed in 10 ml of N-methyl-pyrrolidone, and the dispersion was diluted 10-fold with water. The pH of the diluted dispersion was measured and the results are summarized in Table 1 below.

TABLE 1

|  | PH | Li concentration (ppm) |
|---|---|---|
| Example 1 | 10.3 | 1.4 |
| Example 2 | 10.1 | 1.3 |
| Example 3 | 10.2 | 1.25 |
| Comp. Example 1 | 11.6 | 1.97 |
| Comp. Example 2 | 11.1 | 1.79 |

As shown in Table 1, the cathode active materials prepared according to Examples 1 through 3 each had a pH near 10, and a concentration of Li ions present on the surface of the cathode active material less than 1.5 ppm. However, the cathode active materials prepared according to Comparative Examples 1 and 2 each had a pH greater than 11, and a concentration of Li ions present on the surface of the cathode active material of greater than 1.8 ppm. The composite cathode active materials prepared according Examples 1 through 3 were treated with an organic solvent (in particular, the cathode active materials were treated with 50 to 200 parts by weight of an organic solvent and 1 to 30 parts by weight of an organic acid based on 100 parts by weight of the cathode active material). Because of this treatment, the cathode active materials prepared according to Examples 1 through 3 had decreased basicity due to neutralization caused by the acid. In addition, the Li ions formed a complex compound with the organic anions, making it difficult for the Li ions to leave the solvent. In contrast, the basicity of the cathode active materials prepared according to Comparative Examples 1 and 2 was not sufficiently neutralized and the lithium ions did not sufficiently form complex compounds.

EXPERIMENT 3

Measurement of Electrode Slurry Viscosities

The viscosities of the electrode slurries prepared according to Examples 4 through 6 and Comparative Examples 3 and 4 were measured and the results are summarized in Table 2 below. The Programmable Digital Viscometer DV-II+pro (manufactured by Brookfield Company) was used as the viscometer.

TABLE 2

|  | Viscosity right after mixing (cps) | Viscosity after standing for 60 hours (cps) |
|---|---|---|
| Example 4 | 500 | 1230 |
| Example 5 | 500 | 1190 |
| Example 6 | 500 | 1180 |
| Comp. Example 3 | 500 | Above 10000(after 15 hrs) |
| Comp. Example 4 | 500 | Above 10000(after 20 hrs) |

As shown in Table 2, the electrode slurries prepared according to Examples 4 through 6 (including 50 to 200 parts by weight of an organic solvent and 1 to 30 parts by weight of an organic acid based on 100 parts by weight of the cathode active material) had electrode slurry viscosities near 1,000 cps. However, the electrode slurries prepared according to Comparative Examples 3 and 4 had electrode slurry viscosities exceeding 10000 cps after about 15 hours, indicating rapid gelation. The slurries prepared according to Examples 4 through 6 were treated with an organic solvent, resulting in a reduction in the amount of alkali and water. This reduction in alkali and water rendered the crosslinking reaction of the fluoride-based binder insignificant. In contrast, the crosslinking reaction rapidly progressed in the slurries prepared according to Comparative Examples 3 and 4 due to the alkali component of the nickel-based cathode active materials and the remaining water.

EXPERIMENT 4

Evolved Gas Analyzer (EGA) Experiment

The electrode slurries prepared according to Examples 4 through 6 and Comparative Examples 3 and 4 were subjected to evolved gas analysis and the results are shown in FIGS. 1A through 3. The oven temperature was 300° C., helium was used as a carrier gas, and about 100 mg of each sample was used. The experimental temperature ranged from 60 to 610° C., and the temperature was elevated at a rate of 10° C./min.

Figure 1A:
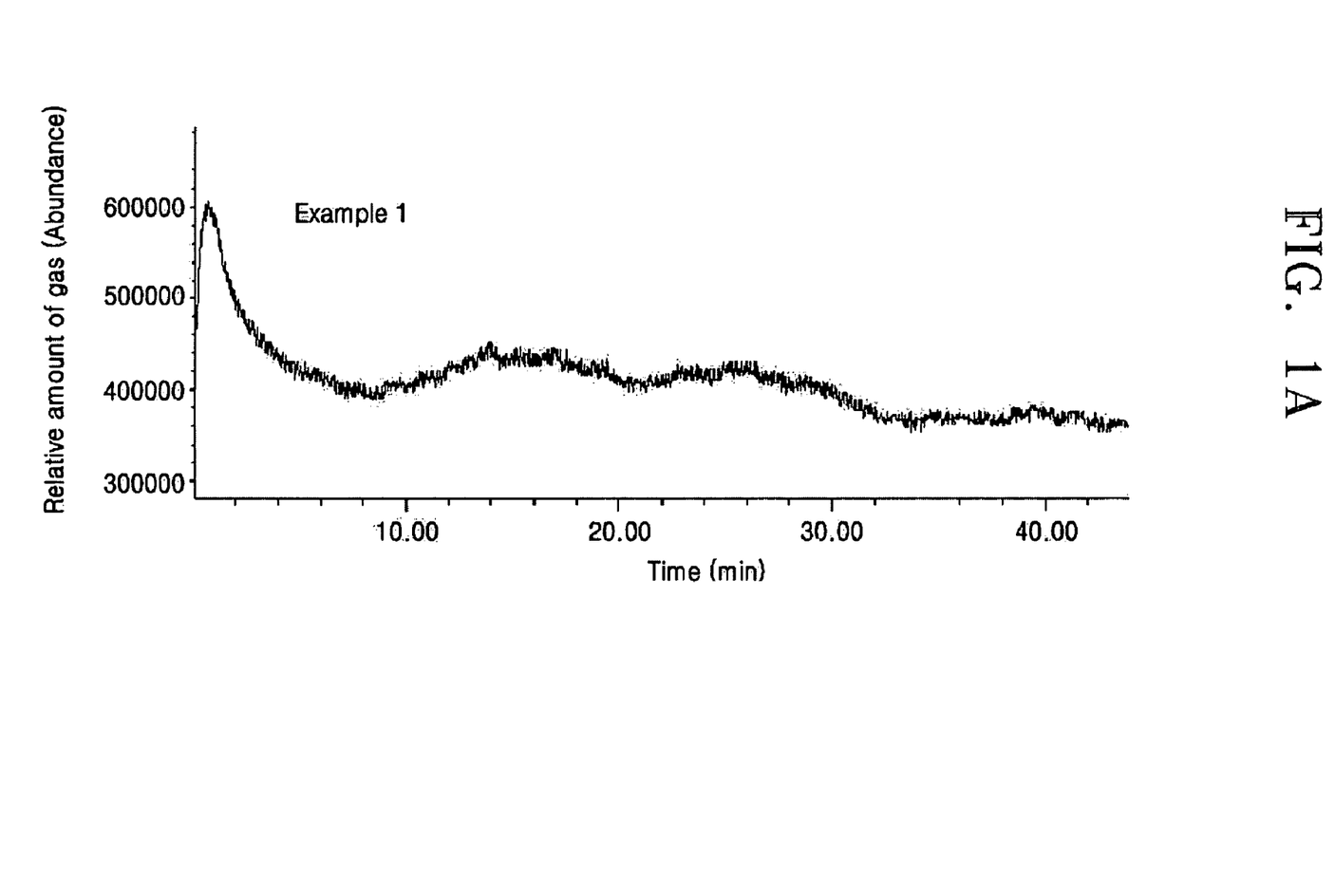
FIGS. 1A through 1C are graphs the results obtained from the Evolved Gas Analyzer (EGA) for the cathodes prepared according to Examples 4 through 6.
Figure 1B:
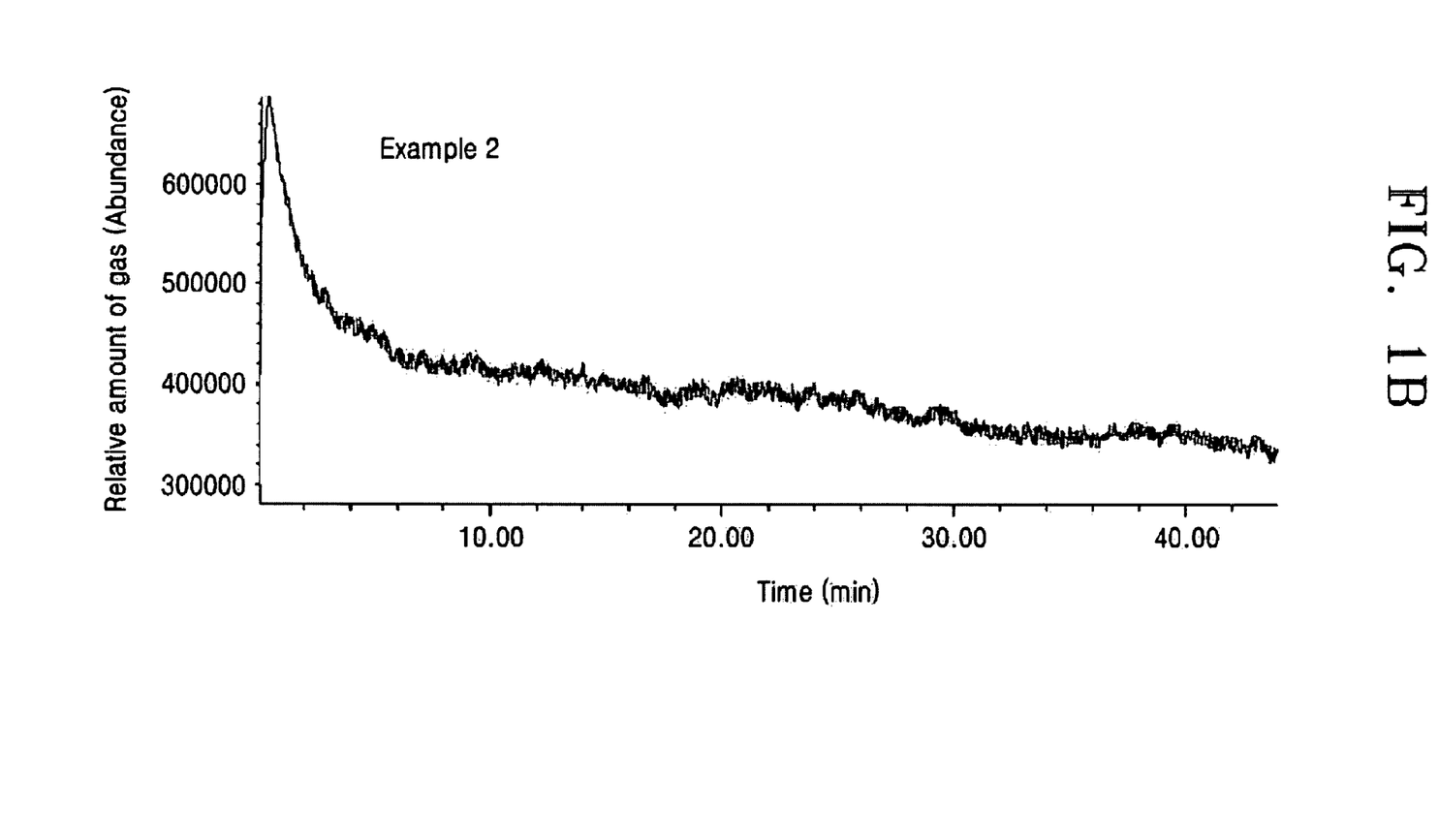
Figure 1C:
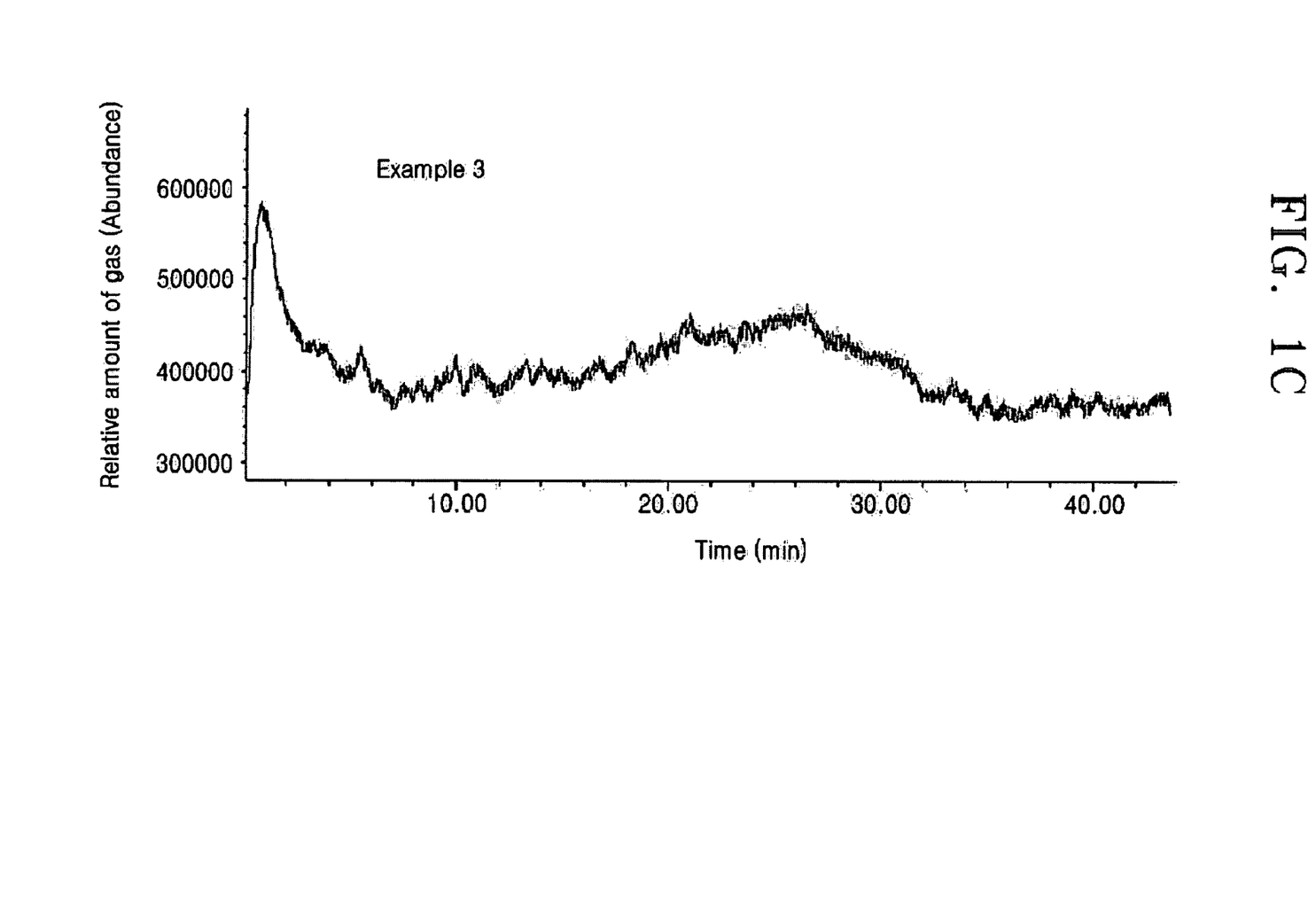
Figure 2:
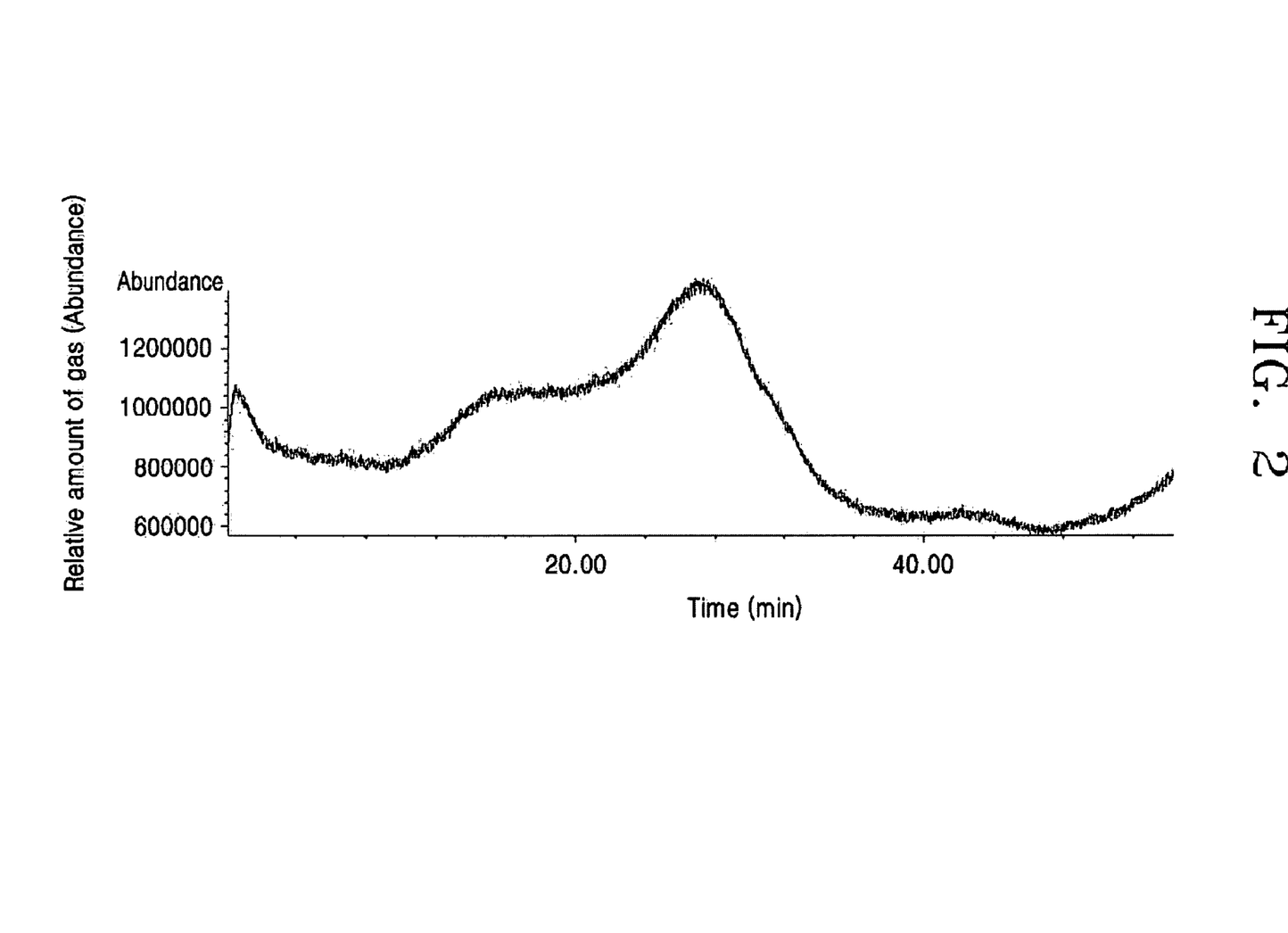
FIG. 2 is a graph of the results obtained from the EGA for the cathode prepared according to Comparative Example 3.
Figure 3:
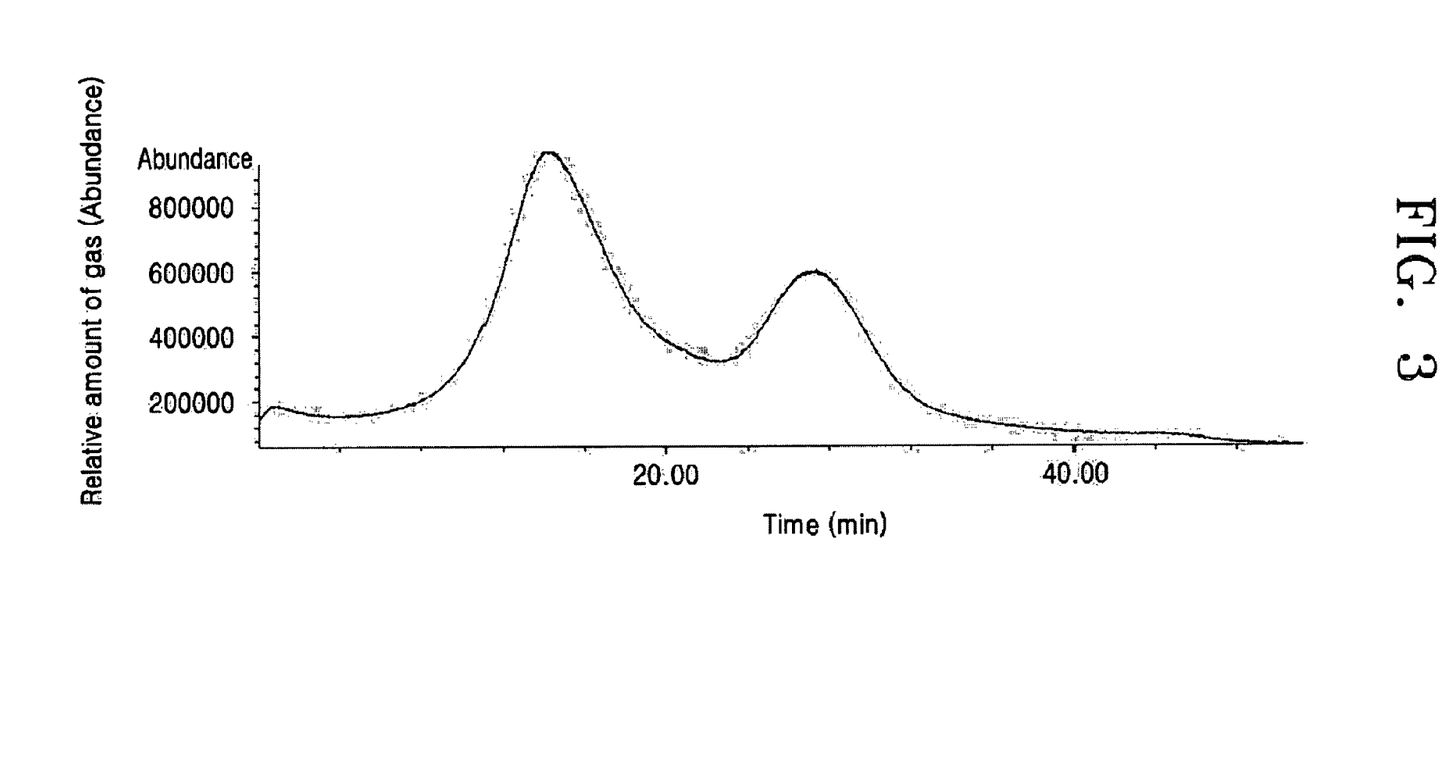
FIG. 3 is a graph of the results obtained from the EGA for the cathode prepared according to Comparative Example 4.

As shown in FIGS. 1A through 3, little gas was generated following the rise in temperature for the slurries prepared according to Examples 4 through 6 (FIGS. 1A through 1C). However, oxygen and carbon dioxide were generated following the rise in temperature for the slurries prepared according to Comparative Examples 3 and 4 (FIGS. 2 and 3), which is recognized from the peaks in the Figures. Little gas was generated in the slurries prepared according to Examples 1 through 3 because water, organic solvent, organic acid and lithium compounds such as $Li_2O$ and LiOH, did not remain in the slurries. In contrast, gas was generated in the slurries prepared according to Comparative Examples 3 and 4 because water, organic solvent, organic acid and lithium compounds such as $Li_2O$ and LiOH, did remain in the slurries.

EXPERIMENT 5

Measurement of High Rate Discharge Capacity

The lithium batteries prepared according to Examples 7 and 8 were charged under a constant current of 1000 mA until the cell voltage against a lithium electrode reached 4.2V. After charging was completed, the batteries were allowed to stand for 30 minutes, and then discharged at 0.2 C to 2 C. High rate discharge capacity was then measured, and the results are shown in FIGS. 4A through 4B.

Figure 4A:
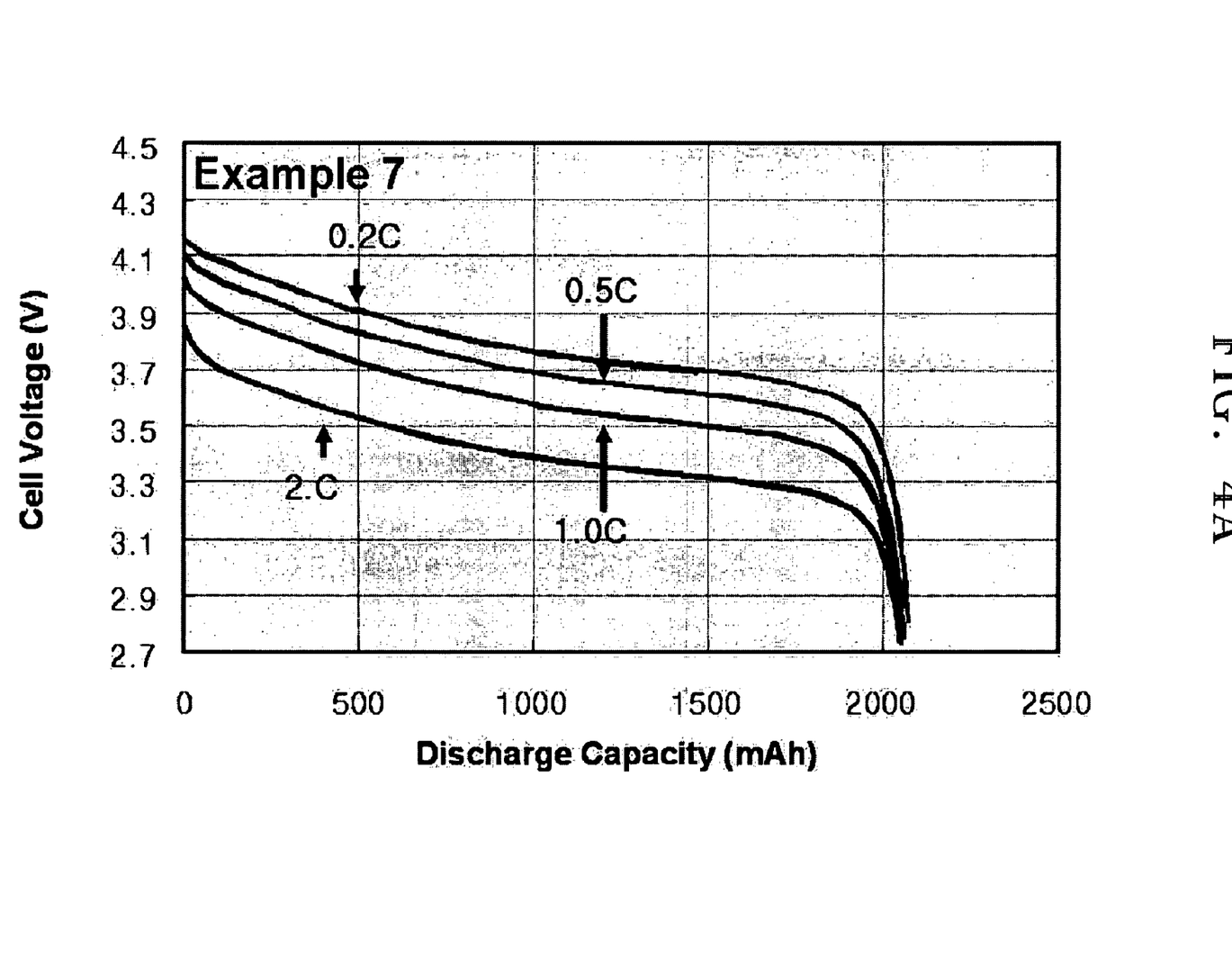
FIGS. 4A through 4B are graphs of the high rate discharge characteristics of the cathodes prepared according to Examples 7 and 8.
Figure 4B:
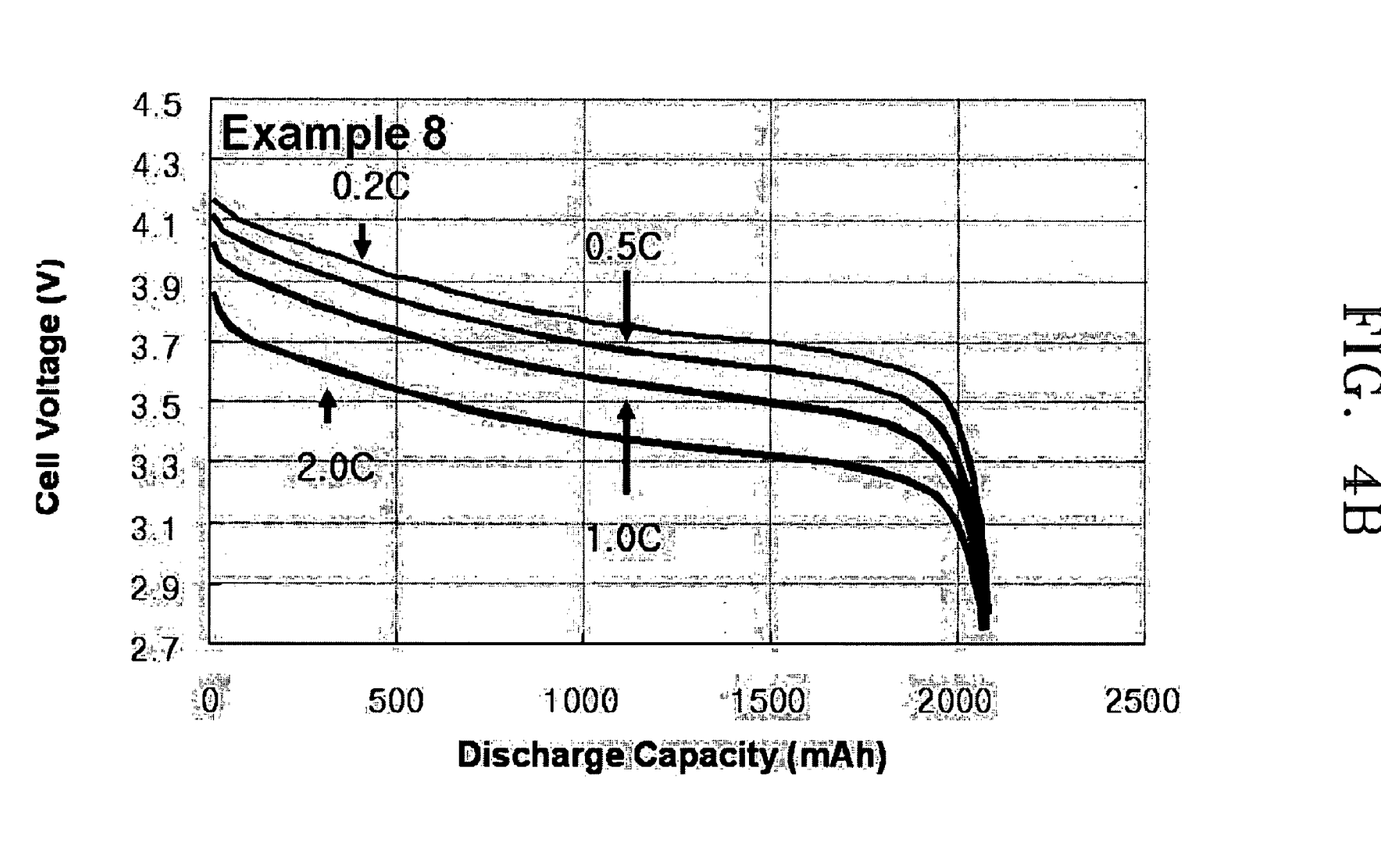

As shown in FIGS. 4A through 4B, the lithium batteries prepared according to Examples 7 and 8 exhibited almost constant discharge capacity even at high rate discharge of 0.2 C to 2 C. In addition, the discharge capacities of the batteries exceeded the theoretical capacity of 2000 mAh/g. The voltage change at high current was about 10%, which was close to the voltage of the reversible electron transfer reaction. These results were achieved because the low viscosities of the slurries made battery preparation easy, enabling the nickel-based cathode active material, the current collector and the binder to bind tightly and uniformly, thereby smoothing electron transfer at the interface.

The composite cathode active materials according to the present invention are prepared by treating a nickel-based composite oxide and an organic acid with an organic solvent. The inventive cathode active materials enable preparation of electrode slurries having high stability because the active material suppresses gelation for a long period of time even when the material is mixed with a fluorine-based polymer. Gelation is suppressed by the reduction in the basicity and the amount of the lithium present on the surface of the active material. The cathodes and lithium batteries comprising the slurries have excellent charge-discharge characteristics, including high capacity and excellent high rate discharge characteristics.

While the present invention has been described with reference to certain exemplary embodiments, it will be understood by those of ordinary skill in the art that various modifications may be made to the described embodiments without departing from the spirit and scope of the present invention as defined by the following claims.

What is claimed is:

1. A composite cathode active material comprising a dry mixture prepared by a method comprising:
    providing at least one cathode active material selected from the group consisting of compounds represented by Formulae I and II;

$$Li_xNi_{1-y}M_yO_{2-\alpha}X_\alpha \qquad I$$

$$Li_xNi_{1-y-z}Co_yM_zO_{2-\alpha}X_\alpha \qquad II$$

wherein $0.90 \leq x \leq 1.1$, $0 \leq y \leq 0.9$, $0 \leq z \leq 0.5$, $0 \leq \alpha \leq 2$, M is selected from the group consisting of Al, Mn, Cr, Fe, Mg, Sr, V, rare earth elements and mixtures thereof, and X is an element selected from the group consisting of O, F, S and P,
    pretreating the cathode active material by mixing the cathode active material with an acid and an organic solvent to form a mixed solution, and
    drying the mixed solution to form a dry acid pretreated cathode active material.

2. The composite cathode active material according to claim 1, wherein the organic solvent is selected from the group consisting of alcohols, aldehydes, ketones, ethers and mixtures thereof.

3. The composite cathode active material according to claim 2, wherein the organic solvent is selected from the group consisting of methanol, ethanol, propanol, methyl aldehyde, ethyl aldehyde, dimethyl ketone, diethyl ketone, methylethyl ketone, dimethyl ether, diethyl ether and mixtures thereof.

4. The composite cathode active material according to claim 1, wherein the organic solvent is present in the mixed solution in an amount ranging from about 50 to 200 parts by weight based on 100 parts by weight of the cathode active material.

5. The composite cathode active material according to claim 1, wherein the acid is selected from the group consisting of hydrochloric acid, sulfuric acid, nitric acid, formic acid, acetic acid, carbonic acid, propionic acid, benzoic acid, phenol, boronic acid, oxalic acid, mixed acids, tartaric acid, phthalic acid, hydrogen sulfide, phosphoric acid, citric acid, succinic acid, maleic acid, malonic acid and mixtures thereof.

6. The composite cathode active material according to claim 1, wherein the acid is present in the mixed solution in an amount ranging from about 1 to about 30 parts by weight based on 100 parts by weight of the cathode active material.

7. A cathode comprising the composite cathode active material according to claim 1.

8. A lithium battery comprising the cathode according to claim 7.

9. A cathode slurry comprising the cathode active material according to claim 1, a conductive material, a binder and a diluent.

10. The cathode slurry according to claim 9, wherein the conductive material is selected from the group consisting of activated carbon, carbon cokes, natural graphite and artificial graphite, the binder is selected from the group consisting of polyvinylidene fluoride, polyvinyl fluoride, and copolymers thereof, and the diluent is selected from the group consisting of acetone, methyl ethyl ketone, acetyl acetone, cyclohexanone, methyl acetate, methyl acrylate, diethyl carbonate, -butyrolactone, dimethyl formamide, dimethyl acetamide, N-methyl-2-pyrrolidone, hexamethylphosphoramide, diethylene triamine, ethylene oxide, propylene oxide, tetrahydrofuran and dioxane.

11. A cathode comprising a dried composition of the cathode slurry according to claim 9.

12. A lithium battery comprising the cathode according to claim 11.

13. A method of preparing a cathode active material comprising:
    providing at least one cathode active material selected from the group consisting of compounds represented by Formula I and compounds represented by Formula II;

$$Li_xNi_{1-y}M_yO_{2-\alpha}X_\alpha \qquad I$$

$$Li_xNi_{1-y-z}Co_yM_zO_{2-\alpha}X_\alpha \qquad II$$

wherein $0.90 \leq x \leq 1.1$, $0 \leq y \leq 0.9$, $0 \leq z \leq 0.5$, $0 \leq \alpha \leq 2$, M is selected from the group consisting of Al, Mn, Cr, Fe, Mg, Sr, V, rare earth elements and mixtures thereof, and X is selected from the group consisting of O, F, S and P;
    pretreating the cathode active material by mixing the cathode active material with an acid and organic solvent to form a mixed solution;
    drying the mixed solution at a temperature ranging from about 200 to about 700° C. for a period of time ranging from about 2 to about 24 hours to form a dry acid pretreated cathode active material.

* * * * *